Oct. 30, 1934.                D. REPONY ET AL                1,978,912
                                   BELT
                            Filed Sept. 2, 1932           2 Sheets-Sheet 1
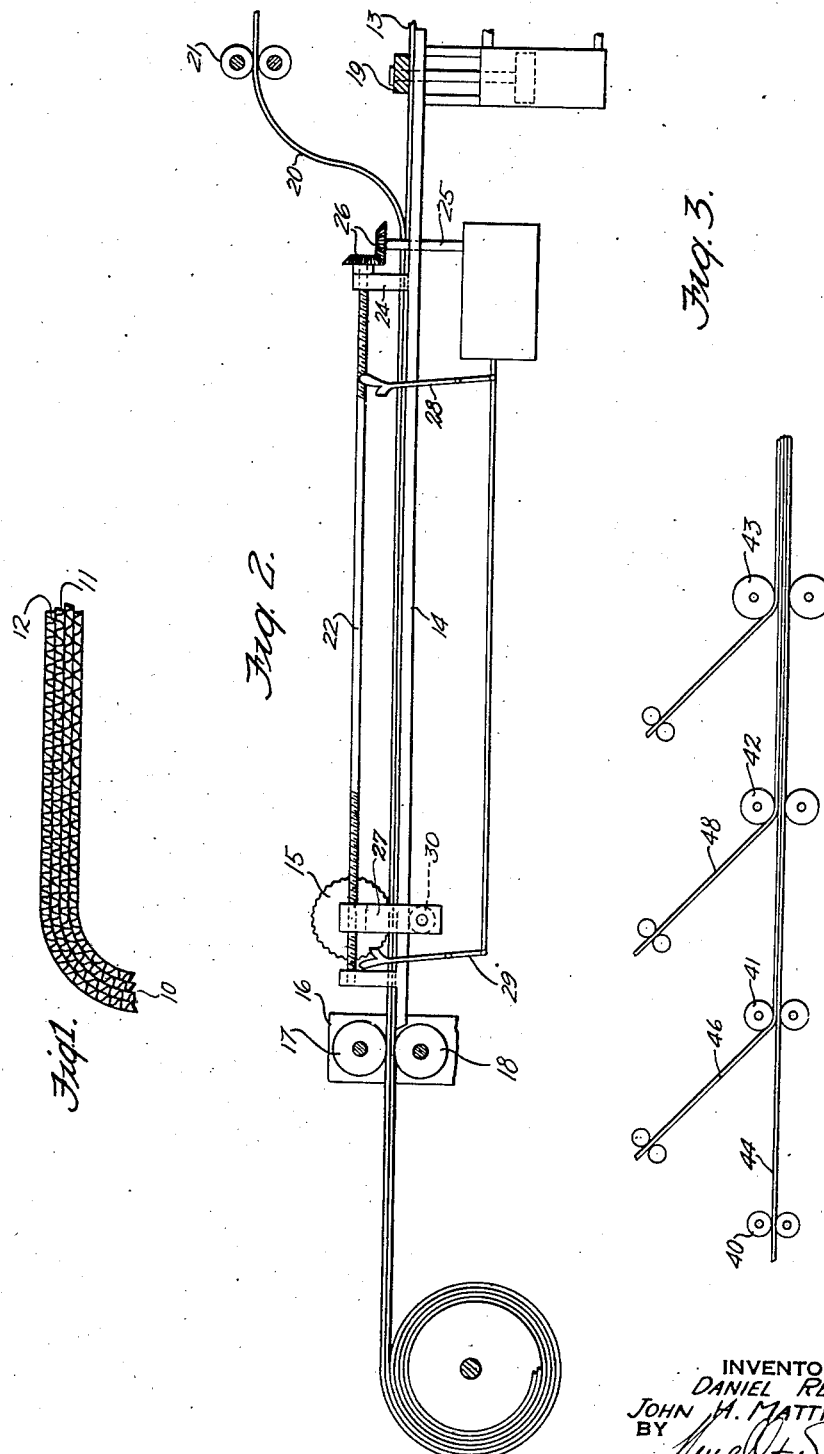
INVENTORS
DANIEL REPONY &
JOHN H. MATTHEWS
BY
ATTORNEY Oct. 30, 1934.  D. REPONY ET AL  1,978,912
BELT
Filed Sept. 2, 1932   2 Sheets-Sheet 2

INVENTORS
DANIEL REPONY &
JOHN H. MATTHEWS
BY
ATTORNEY

Patented Oct. 30, 1934

1,978,912

UNITED STATES PATENT OFFICE 1,978,912

BELT

Daniel Repony, Clifton, and John H. Matthews, Nutley, N. J., assignors to Raybestos-Manhattan, Inc., Passaic, N. J., a corporation of New Jersey Application September 2, 1932, Serial No. 631,488

8 Claims. (Cl. 154—4)

This invention relates to a method and apparatus for making laminated belts so that under tension the belt will have a natural curvature. More particularly, the invention relates to the manufacture of belting by the assembly of successive layers which have been so treated as to exhibit different capacities for stretch when assembled into a belt, and to apparatus for treating the layers to control their capacity for stretch and for combining them in such condition.

Although the art of making belts for power transmission is one which is almost as old as power-driven machinery, and although for nearly seventy-five years laminated belts have been made by cementing together with rubber layers of cloth such as canvas duck, there has, during all this time prior to our invention, been considerable difficulty experienced with such belts, due to ply separation. It has been suggested for many years before our invention that this ply separation, "bootlegging", as it is called, is due at least in part to the alternating strain resulting from the passage of the belt successively over the curved pulleys and along a straight path between the pulleys. Nevertheless, no satisfactory way has been discovered by which this alternating strain could be avoided, and the difficulty with ply separation has continued.

Other difficulties which heretofore have been inherent in such belts and have seriously limited their useful life are the pulling out of fasteners, whether stitchings, splicing, or metallic fasteners, and the breaking of outside plies or of warp threads in the outside plies. All of these difficulties we have overcome in the belt described and claimed in our co-pending application Ser. No. 702,496 filed December 5th, 1933.

It is, accordingly, an object of the present invention to provide method and apparatus for making such belts which is efficient, economical, and capable of commercial use in the manufacture of belting on a large scale. A further object of our invention is to provide for manufacturing belting in any length, endless or to be cut and stapled, or spliced to form a belt of any desired length.

According to our present invention, the belt is preferably so constructed that the greatest tension comes upon the inner layers at or near the face of the belt which is in contact with the pulley, and the tendency of the inner layers to be dragged ahead of the outer layers is thereby overcome.

If the relative stretch and length of the successive layers are properly adjusted, having regard for the diameter of the driving pulley over which it is to run, the stretch of all of the layers of the belt where they are curved around the pulley may be made substantially equal, or even a little less on the outer ply than on the inner one.

As the natural curvature of the belt approaches the diameter of the pulley, destructive tendencies are lessened; and, although certain advantages of our invention, as for example the hugging of the pulleys by the belt, occur more fully when the natural curvature at the operating tension becomes sharper than that of the pulley, nevertheless, other advantages, notably reduction of destructive internal strains in the belt, will be largely taken advantage of before the curvature actually reaches that of the pulley.

We are aware that prior to our invention belts have been made in which the outer layers were to some extent longer than the inner layers, e. g., by winding a fabric onto a drum; but although this affords a convenient method of manufacture, it is not intended to, and in fact does not relieve the outer layers of the belt from the maximum stress and tension, nor prevent the destructive shifting action when the belt is driven over a pulley. We are aware, also, that it has been suggested to manufacture endless laminated belts by wrapping the belt around a pair of pulleys so that each layer is successively longer than the preceding one. So far as we are aware, however, no belt has ever been made in which a satisfactory adjustment has existed throughout the length of the belt,—that is, in which all parts of the belt as they come over the curvature of the pulley would have the stresses approximately balanced or the maximum stress and tension at or near the inner face of the belt.

In the accompanying drawings we have illustrated a number of devices which may be used for the manufacture of belting according to the present invention, and a section of belting made according to our invention. These are intended to be only exemplary and are shown for the purpose of illustrating the principle and a preferred embodiment of the invention.

Fig. 1 is a longitudinal section of a belt made according to the present invention;

Fig. 2 is a diagrammatic view, in side elevation, of a device adapted for manufacturing belting according to the present invention;

Fig. 3 is a diagrammatic view in longitudinal section of another type of apparatus suitable for use in manufacturing belting according to the present invention;

Figure 4:
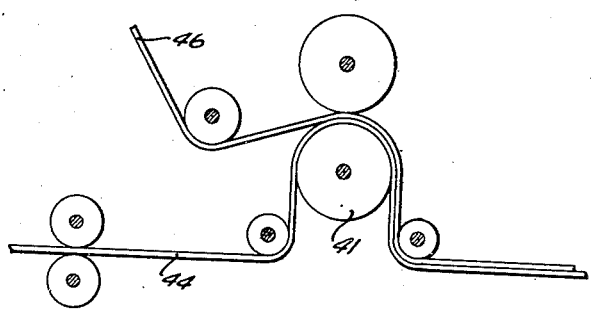
Fig. 4 is a view similar to Fig. 3, showing a section of a slightly modified form of apparatus.

Referring first to Fig. 1, in which we have shown a preferred embodiment of the belting made according to the present invention, it will be observed that in the curved portion indicated by the reference character 10, the successive layers of duck of which the belting is made show substantially equal crimp, whereas on the flat portion of the belt indicated by the reference character 11, the crimp of the warp in the outer layers is substantially greater than that of the inner layers. This is one way of securing the desired graduation in capacity for stretch. When the belting is made with the same or similar fabric in each of the layers, this effect may be obtained either by joining the layers on a curve or in other manner effecting a smooth adhesion between layers, one of which is slightly longer than the other, or by stretching the successive layers progressively more from the outer toward the inner face of the belt, and securing the layers together while the inner ones are thus stretched. Another simple method of attaining this result is to utilize for the successive layers fabrics which are specially woven to provide successively more elongation under a given tension.

In either case, the belt may be formed and vulcanized in a flat press, but in the former case, the finished belt will have a natural curvature when relaxed, whereas in the latter case, in the fully relaxed condition, the belt will tend to lie out flat, but since under tension the outer layers will stretch more readily than the inner, this belt also will have, under tension, a natural curvature which will cause it to hug the pulleys in the same manner as belting made on a curve, or by progressive stretching of the inner layers of fabric, etc.

By natural curvature, we mean, of course, a tendency to assume a curved, rather than a flat, condition, that is to say, the internal stresses will be most nearly balanced when the belt is in curved form, rather than when it is straight, and this may be demonstrated by the relative magnitude of forces which are required to bend the belt toward and away from any given curvature under a given tension.

When the belt as illustrated, for example in Fig. 1, is put into service, it is found not only that it will serve very much longer without ply separation or other serious deterioration, but that because of its inherent tendency to hug the pulley, because of its natural curvature, it will transmit a given power with lighter bearing loads, that is, with less tension between the pulleys, or with smaller pulleys than would be required under the practice which has heretofore been regarded as standard.

It is also found that in service the primary load falls upon the inner plies of the belt. If the belt is properly designed for the pulleys on which it is used, the stretch of the outer plies which results from flexing around the pulleys will result in a tension upon those plies which will approximate, or will be progressively slightly less than, the tension on the inner plies. The tension will be distributed among the plies in proportion to their resistance to the amount of stretch which occurs. When the outer plies stretch sufficiently easily it follows that between the pulleys the power is transmitted primarily by the inner plies, supported to a lesser extent by the outer plies. This is in contrast, of course, to belts as made heretofore, in which the tension is greatest upon the outer plies and particularly on the curvature around the pulleys the stretch of the outer plies is sharply increased while the innermost plies are relaxed or even compressed.

In referring above to the progressive increase in length or in capacity for stretch, etc., we do not intend to imply that it is essential that this change occur in every case from ply to ply. On the contrary, we have found it best to make the inner ply longer than would give a uniform progressive change, e. g., of substantially the same length and stretch as the next outer ply, and then to make the remaining plies successively longer, or with successively greater stretch as the outside of the belt is approached. In this way, the innermost ply, which is subjected to frictional wear on the surface of the pulleys, may be relieved from an important part of the tension which would be thrown thereon if the length of all plies were adjusted so that each is equally and progressively longer than the next, and the second ply of the belt may even take a greater part of the tension than the innermost ply which contacts with the face of the pulley. Similarly, in some cases, other plies in the belt may be adjusted less or more than would be theoretically required. We have found that except for the relief of the inner ply it is ordinarily desirable to adjust fully the layers of the belt by regular and progressive increases from ply to ply of length or capacity for stretch.

As has already been suggested above, the belt of our invention embodying these characteristics may be made in various different ways. The first, which has been suggested above, is the utilization of different fabrics which, from an inner ply toward the outer, each is possessed of a slightly greater capacity for stretch. When this expedient is adopted, the belt may be made substantially according to present practice, except that care should be taken that the plies with the greater capacities for stretch are not excessively stretched during the plying up process.

A second method of manufacture is illustrated in Fig. 2. In this case, the inner ply 13, or preferably the two inner plies which have previously been joined, e. g., by means of a calender not shown, are fed onto a table 14, and under a heavy hobnail press roll 15, to a pulling device 16. In the present case, this pulling device is illustrated as consisting of a pair of calender rolls 17 and 18 adapted to be moved intermittently. The end of the ply or plies 13 is engaged between the rolls 17 and 18, and at the same time the ply or plies 13 are clamped to the opposite end of the table 14, e. g., by means of an hydraulically operated clamp 19. The stretching device 16 is then operated to produce a predetermined elongation in the length of the ply 13 which is upon the table 14, and the next outer ply 20 is then fed from between the feed rolls 21 and led along the table 14 on top of the ply or plies 13 smoothly, but without tension. One or both of the plies 13 and 20 preferably have previously been frictioned or impregnated with rubber; if not, the impregnation should be effected upon the table 14, before the ply 20 is laid thereon. The press roll 15 is then moved along the table so as to join securely the two plies 13 and 20 along the entire length of the table. We prefer to use a hobnail roll for this purpose because of the greater pressure which can be effected at spaced points in this manner, and because it is unnecessary to effect complete adhesion at this time. In the apparatus illustrated, the movement of the press roll is effected mechanically by means of a screw shaft 22 mounted in bearing blocks 23 and 24, and driven, for example, by a shaft 25 through the pinion gears 26. The screw shaft 22 operates in a threaded block 27 on the end of the press roll, and serves to drag the roll along the table 14 until the block 27 contacts with the reversing lever 28. When this lever 28 is moved by the block 27, it serves to operate a reversing clutch not shown, and thereby to move the roll back again over the table 14 until the clutch lever 29 is operated, which lever is moved automatically by the block 27 to disconnect the reversing clutch and when manually moved further to reengage the clutch for forward operation.

It will be observed that when the roll 15 is in its extreme left hand position, it is directly over the carriage roll 30, so that when the clamp 19 has been released, the combined plies 13 and 20 may be drawn between these rolls. Instead of this arrangement, the table 14 may be somewhat depressed so as to leave a free place through which the plies may be drawn after the movement of the press roll 15 is complete.

In the preferred embodiment as illustrated, the combined plies, after leaving the table 14, are passed through the calender 16 further to join the layers of duck. The rolls of the calender may be so arranged that the combined layers 13 and 20 are flexed around one of the press rolls when they pass through the bight of the calender, the outer ply 20, being next to the roll around which it is flexed,—that is, on the inside curve. After calendering in this manner to securely press the two layers together, they may be vulcanized, as usual, in a flat belting press, preferably under tension sufficient to smooth out both plies, or with some advantage may be tightly rolled with a resilient sheet metal liner between the turns on the roll, and vulcanized in roll form.

As described above, the belt would consist of only three plies. Obviously, the apparatus may be duplicated so that instead of feeding directly from the table 14 or the calender 16 to a belting press, etc., the combined plies 13 and 20 may be fed to a second similar device in which both plies are suitably stretched and another slack ply secured thereon, and this may be repeated several times until the desired number of plies have been built up; or where repetition of the apparatus is objectionable, a suitable length of belting may be formed by passage through the apparatus, after which it may be again fed through, this time taking the place of the ply 13 and having another ply 20 secured thereon. In this manner, also, endless belts may be made by drawing the ply 20 out to a suitable length and returning its ends along the table 14 beneath the ply 20, so that it corresponds to the ply 13 as shown in Fig. 2.

In Fig. 3, the apparatus consists of a series of press or calender rolls 40, 41, 42 and 43, etc., which are geared together so that each is driven at a slightly faster rate than the preceding one. An inner layer or layers are fed between the initial press or feed rolls 40 at a rate controlled by the speed at which said rolls are driven. This layer, after joining the next layer 46, passes therewith through the calender 41. The combined layers 44 and 46 are then joined by another layer 48, and together these pass through the calender 42. This may be repeated as often as there are plies to be built up. As will be readily understood from what has been said above, the difference in speed between each successive calender results in a stretching of the ply, or combined plies, between the calenders, and when these are combined with the next ply which is in slack condition, the desired difference in relaxed length or capacity for stretch may be achieved.

As in the case of the apparatus shown in Fig. 2, the combined layers produced by the calender 41 may, after a suitable length has been produced, be returned through the rolls 40 and 41 to have an additional ply secured thereon instead of passing successively through a series of rolls 40, 41, 42, etc.; and similarly, also, an endless belt may be produced by drawing out a suitable length of the ply 46 and passing it through the rolls 40 and 41, building up ply on ply by continuous passage of the belt therethrough until the desired thickness has been produced.

In Fig. 4, we have illustrated a portion of an apparatus similar to that shown in Fig. 3, in which, instead of calenders operating at a different speed to stretch the lower ply or plies, the calender may be operated at the same speed, or with slack goods between successive rolls or calenders, and the difference in length of successive plies may be accomplished by combining the plies upon the circumference of the press roll, e. g., of the calender 41, and by flexing the combined layers closely around the roll 41 while they are being passed through the bight of the calender.

In this case, also, the units may be multiplied as shown in Fig. 3, or a given length or an endless belt may be produced by repeated passage through a single unit.

Figure 5:
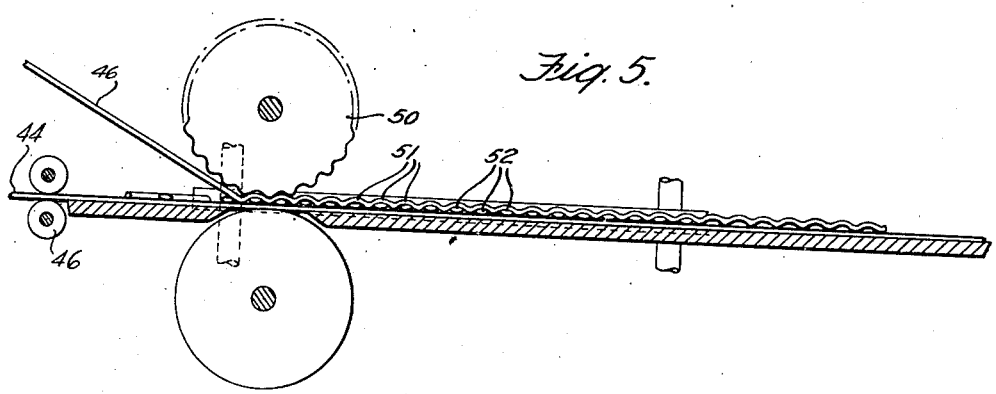
Fig. 5 is a diagrammatic view in longitudinal section of still another type of apparatus.
Figure 6:
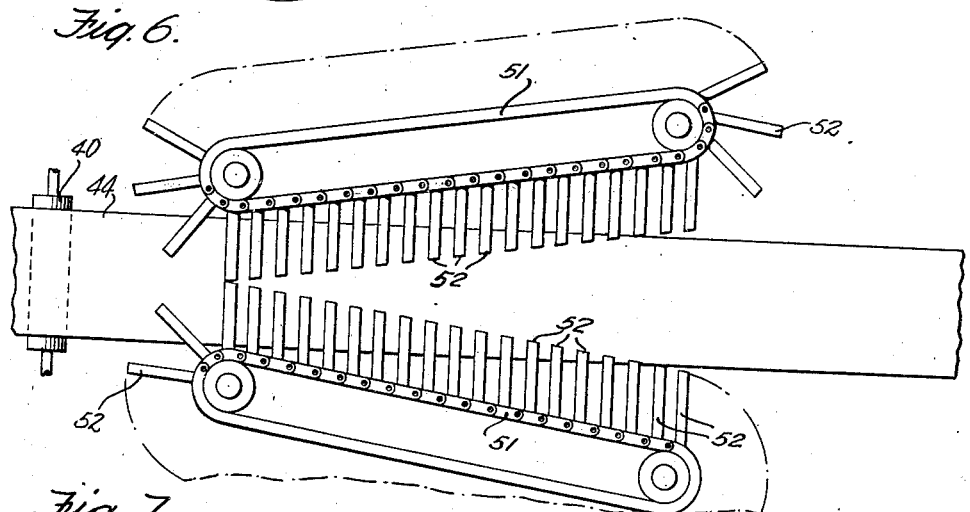
Figs. 6 and 7 are detail views in plan and cross-section, respectively, illustrating the corrugating device of the apparatus illustrated in Fig. 5.
Figure 7:
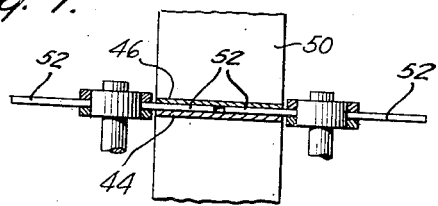

In Fig. 5, the strip 44 is fed between the press rolls 40, as in Fig. 3. In this case, however, the next set of rolls, instead of being smooth, as in the case of the calender 41 of Fig. 3, comprises a corrugated roll or rolls 50; and sprocket chains 51 with pins 52 rotate beside the calender rolls 50, so that the pins 52 move over the surface of the lower ply or plies 44, and at substantially the same rate therewith, and carry the slack ply 46, assuring a slight corrugation of said ply which will correspond with the corrugations of the roll 50. Thus, when the superposed plies are joined by the pressure of the roll 50 at spaced points, there will be a certain amount of slack left in the upper ply, and when the belting thus built up is subsequently vulcanized, preferably under tension, this slack will be taken up and a smooth belt with the desired compensation will result.

We are aware that numerous other apparatus and methods may be used for the manufacture of a belt according to our invention, and that many changes and modifications may be made from the above description and the annexed drawings without departing from the scope of our invention.

Where we have referred above to the layers, it is to be understood the layers referred to may be composed of more than one ply of the fabric. Although we have referred particularly in the above specification to rubber used as adhesive for cementing together the layers of the belt, it is to be understood that other adhesives may be used without departing from the scope of our invention. Thus, for example, in some cases pyroxylin has been used as a binder for laminated belts. Similarly, we have referred to textile fabrics for example of the material treated by this process and apparatus in the manufacture of belting, but it is to be understood that the process and apparatus of our invention may be used with any other belting materials, as will be obvious to those skilled in the art. Although the invention is of greatest advantage in power transmission belts, because of the relatively great stresses which result from the power applied to the belt, the invention is none the less applicable to other types of belting, as for example, conveyor belts, etc.

What we claim is:

1. The method of forming a laminated belt which comprises flexing a layer of belting material over a surface curved on a small radius relative to that of a circle with circumference equal to the length of the belt to be formed, applying a second layer of belting material to the first upon the curved surface and securing the superposed layers together by surface adhesion progressively over substantially their entire area while they are on such curve.

2. The method as defined in claim 1, in which at least one of said layers of belting material is covered with a layer of cementing rubber to which the other is secured by pressure, and the resulting belt is vulcanized while flat, but under tension sufficient to smooth all of the layers.

3. The method of forming a laminated belt which comprises stretching a layer of belting material, securing thereon while so stretched another layer of belting material which is not stretched to an equal extent.

4. A method of forming a laminated belt which comprises stretching over a supporting surface a layer of belting material which in use is to be near the face of the pulley on which it runs, laying thereon a relatively slack layer of belting material which in use is to be farther from the face of the pulley, securing the layers together throughout their length, and thereafter releasing the tension thereon.

5. The method of making a laminated belt which comprises weaving a strip of fabric with relatively great crimp of the longitudinal threads, weaving another strip of fabric with a lesser crimp of the longitudinal threads, and securing said strips together throughout their length.

6. A method of making a laminated belt which comprises corrugating a strip of belting material, feeding it to a second layer of belting material which is held more nearly straight, securing the two together at the nodes of the resulting corrugations formed in the first layer, and thereafter securing said strips together over substantially their entire surface.

7. An apparatus for making belts comprising means for stretching a length of belting material, means for supplying thereon a second layer of belting material slack relative to the first, means for securing said layers together while the first is still stretched, and means for feeding said belting.

8. An apparatus for making belting which comprises means for applying an adhesive to a strip of belting material, a forming roll of small circumference as compared with the length of the belt being made, means for flexing said strip over only a part of the circumference of said roll, means for applying a second strip on top of the first, so that it passes therewith over and around a part of said forming roll, and means for securing said strips together while they are on said forming roll.

DANIEL REPONY.
JOHN H. MATTHEWS.